United States Patent [19]
Murphy, Jr. et al.

[11] Patent Number: 6,006,266
[45] Date of Patent: Dec. 21, 1999

[54] MULTIPLEXING OF CLIENTS AND APPLICATIONS AMONG MULTIPLE SERVERS

[75] Inventors: Thomas Edwin Murphy, Jr., Binghamton; Jeffrey Scott Stevens, Endwell, both of N.Y.

[73] Assignee: International Business Machines Corporation, Armonk, N.Y.

[21] Appl. No.: 08/785,915

[22] Filed: Jan. 21, 1997

Related U.S. Application Data

[60] Provisional application No. 60/019,128, Jun. 3, 1996.

[51] Int. Cl.[6] .................................................. G06F 13/00
[52] U.S. Cl. ........................... 709/227; 709/203; 709/102
[58] Field of Search ............................... 395/200.66, 672, 395/706, 200.37, 200.53, 684; 709/229, 234, 206, 207, 223, 102, 304, 200, 201, 227, 203, 208

[56] References Cited

U.S. PATENT DOCUMENTS

| | | | |
|---|---|---|---|
| 5,278,984 | 1/1994 | Batchelor | 709/207 |
| 5,293,620 | 3/1994 | Barabash et al. | 709/102 |
| 5,754,830 | 5/1998 | Butts et al. | 709/227 X |
| 5,761,507 | 6/1998 | Govett | 709/304 |
| 5,768,594 | 6/1998 | Blelloch et al. | 395/706 |

OTHER PUBLICATIONS

Williams, Ross N. *A Painless Guide to CRC Error Detection Algorithms*, Version 3, Rocksoft Pty Ltd, Hazelwood Park, Australia, 46 pages, Aug. 19, 1993.

Stevens, W. Richard. *UNIX Network Programming*, Prentice Hall Software Series, copyright 1990, pp. 260–261.

Ritter, Terry. "The Great CRC Mystery," *Dr. Dobb's Journal*, Feb. 1986, 6 pages, beginning at page 26.

IBM. *IBM AS/400 System API Reference*, vol. 1, Version 3. IBM publication SC41–3801–00, Sep. 1994, pp. 65–1 through 65–74.

*Primary Examiner*—Zarni Maung
*Assistant Examiner*—Patrice Winder
*Attorney, Agent, or Firm*—Shelley M Beckstrand

[57] ABSTRACT

In an Internet system having a plurality of applications, and a plurality of servers for attachment from a plurality of web browsers, a system supports connection oriented applications over a connectionless protocol. At least one of the servers is a master server work station gateway owning a well-known port, and the other servers are slave servers supporting established web browser-to-application state sessions.

Dynamic session authentication checking is done by the server to prevent the occurrence of screen spoofing by providing authentication keys which are unique to each session and each panel.

20 Claims, 9 Drawing Sheets

MULTIPLEXING OF CLIENTS AND APPLICATIONS AMONG MULTIPLE SERVERS

CROSS-REFERENCES TO RELATED APPLICATIONS

This application claims priority under 35 U.S.C. §120 as a nonprovisional application of related U.S. patent provisional application Ser. No. 60/019,128, filed Jun. 3, 1996 entitled "Multiplexing of Clients Applications Among Multiple Servers".

U.S. patent application Ser. No. 08/785,914, entitled "Multiplexing of Clients Applications Among Multiple Servers", filed concurrently herewith is assigned to the same assignee hereof and contains subject matter related, in certain respect, to the subject matter of the present application. The above-identified patent applications are incorporated herein by reference.

BACKGROUND OF THE INVENTION

1. Technical Field of the Invention

The present invention relates to computer system communications, and more particularly to a server for supporting connection-oriented type applications (also called "state" applications) over a connectionless-oriented ("stateless") type protocol.

2. Background of the Invention

Internet workstations are connectionless-oriented socket clients or applications that connect to a server only long enough to retrieve an installment of data.

Once the data is retrieved, connectionless oriented socket applications generally disconnect until the next data transaction is initiated by the client. Connection oriented applications assume that the client maintains the connection to the server for the duration of the session. The client only disconnects when the session is being ended.

With connection-oriented applications, the identity and synchronization of both the client and server are known to both sides of the connection. Thus, it is taken for granted that the client is trusted and the data exchange is synchronized (in particular, the "current" or "active" application panel is known).

However, in connectionless-oriented applications, in which the Hypertext Transfer Protocol (HTTP) class of service belongs, this connection is not maintained, and thus the identity and synchronization of either the client or server, or both, may change unknown to the other side. This has the potential to result in "out-of-sync" data exchanges, and it is not known if the reconnecting client was the original session initiator. This could "break" an application or expose sensitive data to another, unauthorized client. Consequently, there is a need in the art to assure that once an application is started with a given web browser, another browser cannot come along and connect or "spoof" (that is, steal, or take over) that browsers connection and application.

The IBM 5250 datastream is a device specific datastream for an IBM AS/400 computer system. Such a device specific datastream may be a serial stream of data bytes in hexadecimal form. A Workstation Gateway (WSG), acting as a protocol converter, receives IBM 5250 datastreams from connection-oriented type applications that depend on a connected state of direct communication with the attached device. The WSG converts the native 5250 datastreams into an equivalent Hypertext Mark-up Language (HTML) document and delivers the document to the destination client host browser over a connectionless-oriented protocol, called Hypertext Transfer Protocol (HTTP).

The problem of job management is complicated by the fact that all browser-to-application sessions can only be initiated through the one WSG server that owns the socket with the "well-known" port defined for this service. Each session that is initiated must somehow be assigned to another WSG server by the one WSG server owning the "well-known" port.

It is an object therefore of the invention to provide an internet connection for a workstation gateway that supports connection-oriented type applications (can also be called "state" applications) over a connectionless-oriented (or "stateless") type protocol.

It is a further object of the invention to provide a workstation gateway server that supports and connects/reconnects multiple applications and clients through a single server, which maintains the illusion of a connectionless-oriented environment to the browser and a connection-oriented appearance to the interactive application.

It is a further object of the invention to manage multiplexing of web browsers and applications through one or more workstation gateway servers, where each such server may handle one or more browser to application connections.

SUMMARY OF THE INVENTION

In accordance with this invention, in an internet system having a plurality of applications, and a plurality of servers for attachment from a plurality of web browsers, the system supports connection-oriented applications over a connectionless protocol. At least one of the servers is a master (parent) server Work Station Gateway owning a well-known port, and the other servers are slave (child) servers supporting established web browser to application state sessions.

In accordance with a further aspect of the invention, a method is provided for connecting a client to an application, comprising the steps of maintaining in a job available queue a plurality of identifiers of available child jobs; responsive to a request from a client to connect to an application, operating a server parent job to dequeue from said job available queue the identifier of a next available child job and dispatch said request to said available child job; and operating said available child job to establish a connectionless-oriented communications environment for said client and a virtual connection-oriented communications environment for said application.

DETAILED DESCRIPTION OF THE INVENTION

Figure 1:
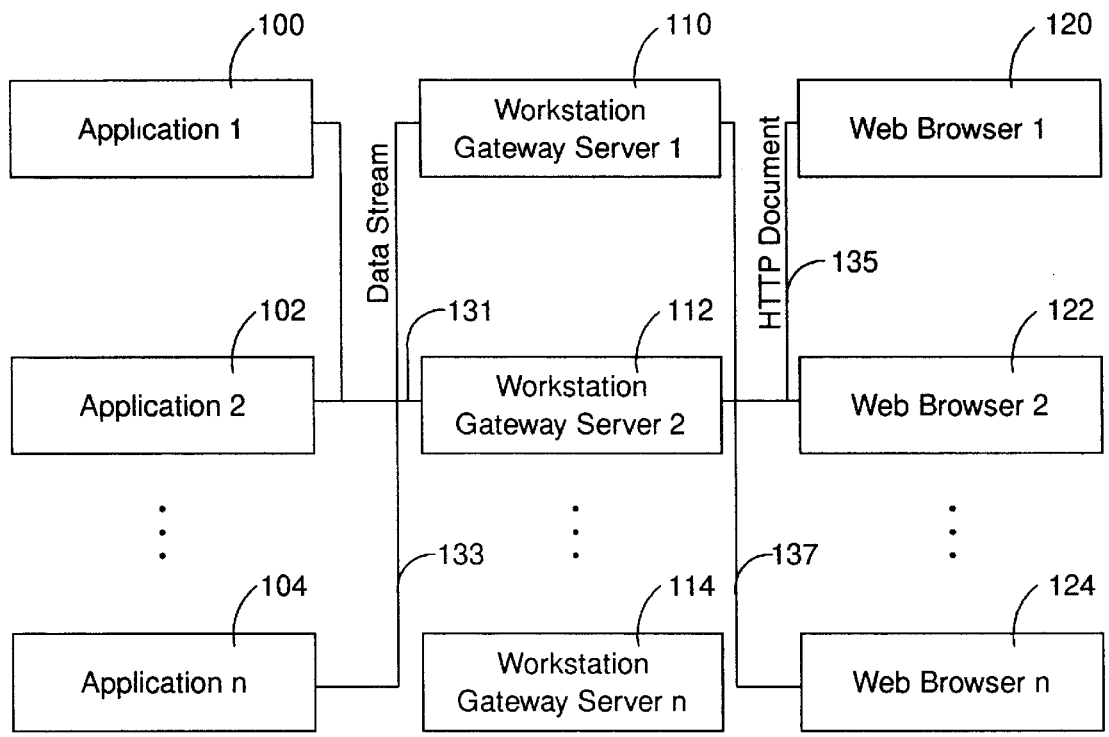
FIG. 1 shows multiplexing of web browsers and applications through multiple servers, where each server may handle one or more browser-to-application connections.

Referring to FIG. 1, a plurality of applications 100, 102, 104 at one or more system nodes, such as may be provided by one or more IBM AS/400 computing systems, are accessed by clients using web browsers 120, 122, 124 through work station gateway servers 110, 112, 114. As is represented by lines 131, 137, gateway server 110 connects browser 124 to application 104, and as is represented by lines 131, 135, gateway server 112 connects browsers 120, 122 to applications 100, 102.

Referring further to FIG. 1, in one specific embodiment of the invention, 5250 datastream 133 is a device specific datastream for an IBM AS/400 computer system. Such a device specific datastream may be a serial stream of data bytes in hexadecimal form. A Workstation Gateway (WSG) 110, acting as a protocol converter, receives IBM 5250 datastreams from connection-oriented type applications 104 that depend on a connected state of direct communication with the attached device. WSG 110 converts the native 5250 datastreams on line 133 into an equivalent Hypertext Markup Language (HTML) document and delivers the document, as is represented by line 137, to the destination client web browser 124 over a connectionless-oriented protocol, called Hypertext Transfer Protocol (HTTP).

Herein, a socket is a unique host identifier created by the concatenation of a port identifier with a transmission control protocol/Internet protocol (TCP/IP) address. A socket address is a data structure that uniquely identifies a specific communications end point; it consists of a port number and network address; and it also specifies the protocol family. See, G. McDaniel, Ed., IBM Dictionary of Computing, McGraw-Hill, Inc., page 632, (1994). Sockets, and socket programming, are well known in the art. See, for example, W. Richard Stevens, UNIX Network Programming, Prentice-Hall (1990), Chapter 6, at pages 260, 261; and, IBM, IBM AS/400 System API Reference, Vol. 3, Version 3, IBM Publication SC41-3801-00, Chapter 65, pages 65-1 through 65-74 (September 1994).

As used in connection with this preferred embodiment of the invention, the following terms have the meanings given:

Port: sockets parlance for the "number" of a socket. All sockets are identified uniquely by their address and port. Two connected sockets are uniquely identified by the four-tuple of the address and port of each socket endpoint.
Socket: a TCP/IP communications protocol entity.
Job: an AS/400 batch job.
Exit: to end an AS/400 batch job.
Session: each AS/400 batch job manages "n" sessions. Each browser client gets allocated one session when a request is made.
Link: Uniform Resource Locator (URL), or hypertext link.
Form: term for a special kind of HTML document.
String: alphanumeric set of characters.
Session string: unique string assigned to identify a session.
Signature: same as session string.
Connect id string: same as session string.
Panel: a display panel, application display panel.
Identifier: a portion (sub-string) of the session string.
Key: a portion (sub-string) of the session string.

Socket programming is described in IBM, IBM AS/400 System API Reference, Vol. 3, Version 3, IBM Publication SC41-3801-00, Chapter 65, pages 65-1 through 65-74 (September 1994), the teachings of which are incorporated herein by reference. In that reference, and in the description which follows of a preferred embodiment of the invention, reference is made to the following socket functions.

| | |
|---|---|
| accept() | Wait for connection request and make connection |

The accept( ) function is used to wait for connection requests. Accept( ) takes the first connection request on the queue of pending connection requests and creates a new socket to service the connection request. Accept( ) is used with connection-oriented socket types.

| | |
|---|---|
| bind() | Set a local address for socket |

The bind function is used to associate a local address to a socket.

| | |
|---|---|
| close() | End socket connection |

The close( ) function is used to close a file or socket descriptor.

| | |
|---|---|
| connect() | Establish connection or destination address |

The connect( ) function is used to establish a connection on a connection-oriented socket or establish the destination address on a connectionless socket.

| | |
|---|---|
| getservbyname() | Get port number for service name |

The getservbyname( ) function is used to retrieve information about services (the protocol being used by the service and the port number assigned for the service). The information is retrieved from the service database file.

| | |
|---|---|
| getsockname() | Retrieve local address of socket |

The getsockname( ) function is used to retrieve the local address associated with the socket.

| | |
|---|---|
| givedescriptor() | Pass descriptor access to another job |

The givedescriptor( ) function is used to pass a descriptor from one OS/400 job to another OS/400 job.

| | |
|---|---|
| ioctl() | Change descriptor attributes |

The ioctl( ) function is used to obtain or change the attributes of a file or socket descriptor.

| | |
|---|---|
| listen() | Invite incoming connections requests |

The listen( ) function is used to indicate a willingness to accept incoming connection requests. If a listen( ) is not done, incoming connections are refused.

| | |
|---|---|
| read() | Receive data |

The read( ) function is used to receive data from a file or a socket.

| | |
|---|---|
| select() | Wait for events on multiple sockets |

The select( ) function is used to enable an application to multiplex I/O. By using selecto, an application with multiple interactive I/O sources avoids blocking on one I/O stream while the other stream is ready. Thus, for example, an application that receives inputs from two distinct communication endpoints (using sockets) can use select( ) to sleep until input is available from either of the sources. When input is available, the application wakes up and receives an indication as to which descriptor is ready for reading.

The application identifies descriptors to be checked for read, write and exception status and specifies a timeout value. If any of the specified descriptors is ready for the specified event (read, write or exception), select( ) returns indicating which descriptors are ready. Otherwise, the process waits until one of the specified events occur or the wait times out.

| | |
|---|---|
| setsockopt() | Set socket options |

The setsockopt( ) function is used to set socket options.

| | |
|---|---|
| socket() | Create socket |

The socket( ) function is used to create an end point for communications. The end point is represented by the socket descriptor returned by the socket( ) function.

| | |
|---|---|
| takedescriptor() | Receive socket access from another job |

The takedescriptor( ) function is used to obtain a descriptor in one OS/400 job which was passed from another OS/400 job by a givedescriptor( ).

| | |
|---|---|
| write() | Send data |

The write( ) function is used to write data to a file or socket descriptor.

Figure 2:
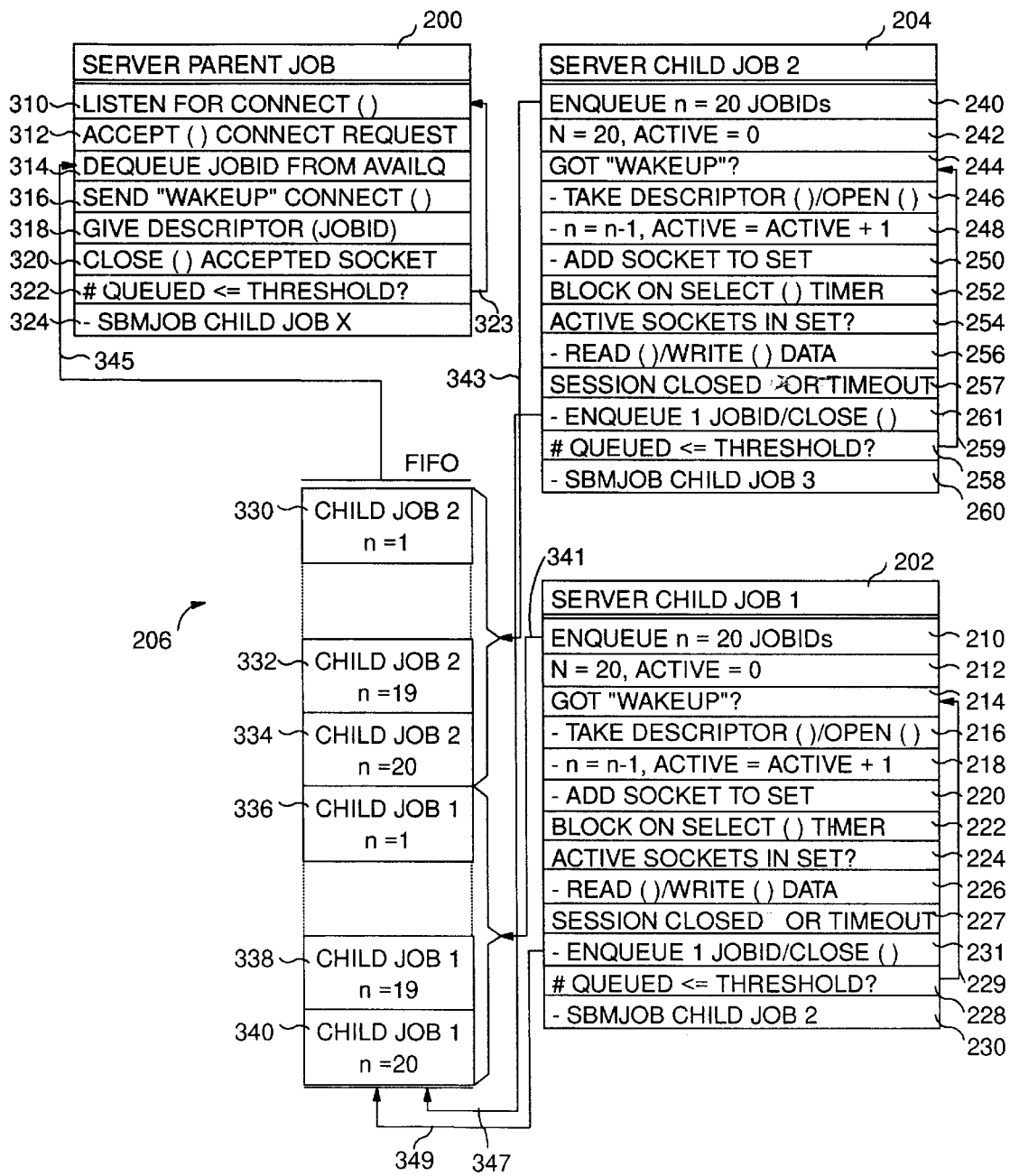
FIG. 2 shows a high level view of a 5250/HTML Workstation Gateway.

Referring to FIG. 2, as will be more fully explained hereafter, one server parent (also referred to as a master server) job 200 and two server child (also referred to as slave server) jobs 202 and 204 are illustrated, along with job available queue 206. (The process implemented by server parent job 200 is further described hereafter in connection with FIG. 7, and that by server child job 202 hereafter in connection with FIGS. 8A and 8B.)

Server parent job 200 executes the following process: in step, 310, job 200 waits for connect( ), which when received, in step 312, executes accepts to accept the connect request. In response thereto, in step 314, job 200 dequeues a JOBID from available queue 206, as is represented by line 345; in step 316 sends "wakeup" connect( ) to the appropriate server child job 202 or 204 (depending on which jobid it dequeued in step 314 ); and issues givedescriptor(jobid) to that job 202 or 204. Thereupon, in step 320, job 200 executes close( ) accepted socket, and asks in step 322 if the number remaining in queue 206 is less than or equal a predetermined threshold—if not, as is represented by line 323, loops back to step 310; and if so, in step 324 issues SBMJOB, an AS/400 command meaning submit job, in this case to start another server child job.

Referring further to FIG. 2, server child job 202 executes the following process. Server child job 204 executes a similar process. Server child job 202, upon being started, as is represented by line 341, initializes by enqueueing n=20 jobids 336–340 on queue 206, as is represented by line 341, and in step 212 sets n =20 and active =0. (The value "n" is obtained from configuration file 438, FIG. 3, which represents all server run time attributes that are settable or configurable by the customer and stored on DASD.) Server child job 202 waits in step 216 for wakeup connect( ) directed to it from step 316 of server parent job 200. Upon receiving "wakeup", server child job 202 executes steps 216, 218 and 220 to takedescriptor( ), set n=n−1 and active= active+1, and add socket to set, respectively. In step 222, server child job 202 blocks on select( ) timer, and upon timeout, in step 224, determines if there are active sockets in set. If so, in step 226, server child job 202 causes execution of the appropriate read( ) or write( ) data commands. (Thus, step 222 blocks two ways on selects( ): true blocking if all pending client requests took the yes branch off step 227, and temporary blocking (via timeout) if any clients are still waiting for a yes branch off step 225 (see FIG. 8A.)) (Looking ahead to FIG. 3, the structure provided for implementing this step 226 is illustrated within block 500.) In step 227, server child job 202 determines if the session is closed, and if so, as is represented by line 349, enqueues a jobid to queue 206. In step 228, job 202 determines if the number of jobid's enqueued in queue 206 is equal to or less than some predetermined threshold value and, if so, in step 230, calls SBMJOB to initiate another server job, in this example, server child job 2, and as is represented by line 229, loops back to step 214 to await the next "wakeup" connect( ) from server parent job 200.

Server child job 204 executes, in steps 240–258, 260, and on lines 343, 347 and 259 functions identical to those described above with respect to server child job 202, steps 210–228, 230, and lines 341, 229 and 349, respectively. It also places jobs 330–334 on queue 206, as previously described with respect to jobs 336–340.

Figure 3:
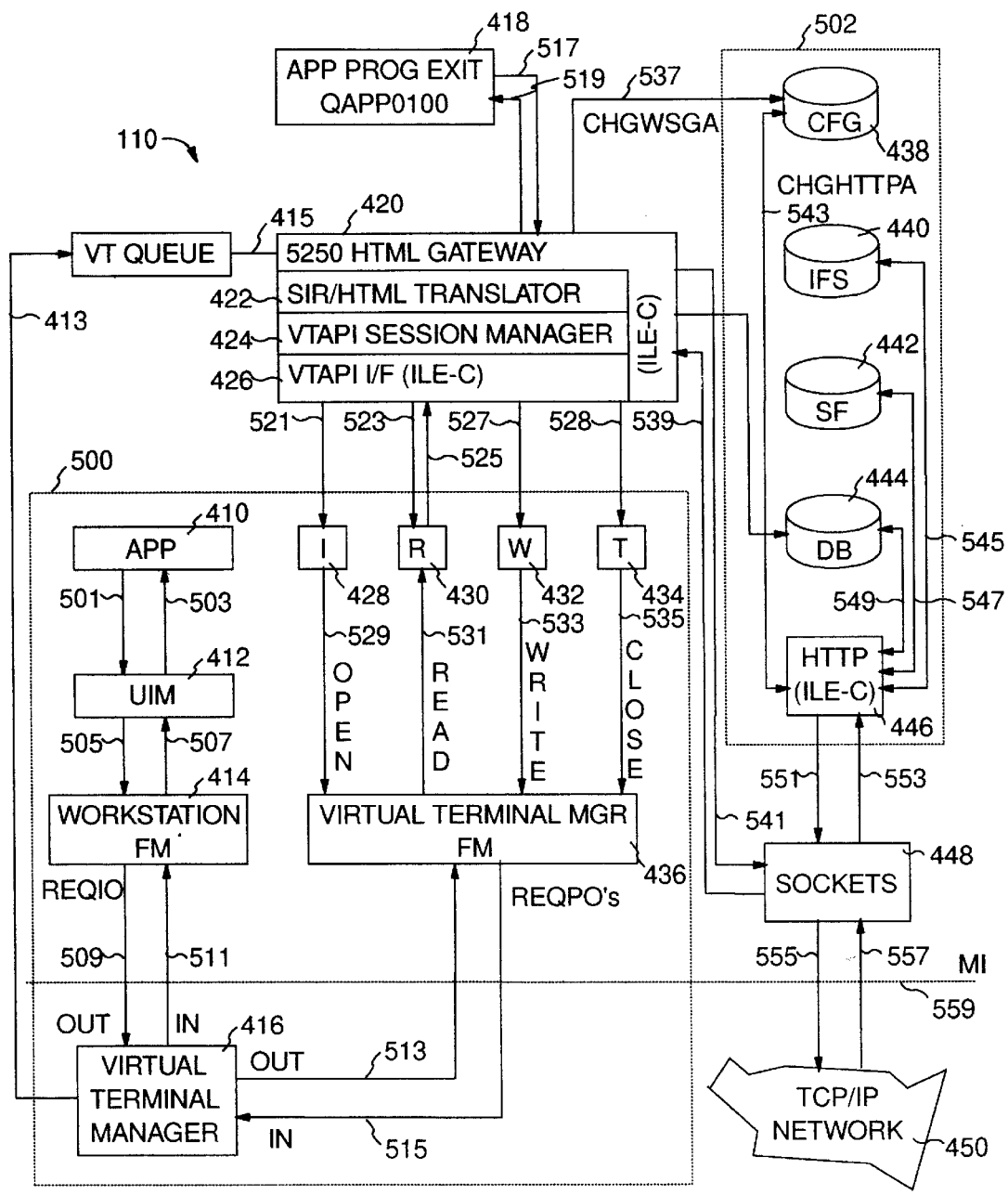
FIG. 3 shows a 5250/HTML Workstation Gateway job structure.

Referring to FIG. 3, the system (program and hardware) structure of the preferred embodiment of the invention is shown for implementing server child jobs 202 (server 110 of FIG. 1) and 204 (server 112 of FIG. 1) in, for example, workstation gateway server 110. Implementation of server parent job 200 is similar, differing in that the structure illustrated within block 500 is not required, as will become apparent hereafter.

As is represented by lines 501, 503, application program (APP) 410 (one of applications 100–104, FIG. 1) interfaces to user interface manager (UIM) 412, which in turn interfaces, as is represented by lines 505, 507, with workstation functional manager (FM) 414. Workstation FM 414 communicates, as is represented by request I/O (REQIO) OUT line 509 and IN line 511, across machine interface (MI) 559 with virtual terminal manager 416. Virtual terminal manager functional manager 436, a superset of virtual terminal manager 416 with controlling Extended Program Facility (XPF) code, communicates across MI 559 with virtual terminal manager 416 via OUT line 513 and IN line 515, by executing the AS/400 internal command: request path operation (REQPO's). (In a preferred embodiment, VTAP I/F 426 does all the interfacing with XPF, and block 436 is merely a logical entity shown for clarity.)

HTTP server 502 includes HTTP workstation server 446, including integrated language environment (ILE-C), an AS/400 facility for C language sockets programs, and accesses files 438, 440, 442 and 444. HTTP workstation server 446 interfaces with sockets block 448 as represented by lines 551 and 553, and with configuration file 438 (via change HTTP attributes commands CHGHTTPA, line 543), integrated file system (IFS) 440 (line 545), shared folders system 442 (line 547) and database 444 (line 549 ). Sockets block 448 communicates across machine interface (MI) 559 with TCP/IP network 450, as is represented by lines 555 and 557. Integrated file System (IFS) file 440, shared folders (SF) file 442, and data base (DB) file 444 contain server run time attributes, each being accessible by HTTP server 446.

Application program exit QAAP0100 block 418 interfaces, as is represented by lines 517 and 519, with workstation gateway 420, which includes standard intermediate representation (SIR)/HTML translator block 422, virtual terminal application program interface (VTAPI) session manager 424, and VTAPI interface (I/F) ILE-C block 426. As is represented by line 413, virtual terminal queue 417 is maintained by virtual terminal manager 416 and, as is represented by line 415, is checked by gateway 420, as will be described hereafter. Workstation Gateway server 420 in FIG. 3 is, for example, Workstation Gateway server 110 of FIG. 1; it is a child job—the parent job being a special case, doing only dispatching to child jobs, and is not seen in FIG. 1. APP PROG EXIT block 418 represents a customer developed user exit program, giving the customer the ability to dictate to the workstation gateway the parameters to use to sign-on to the AS/400 system. This ability is useful for security purposes, in order to avoid having passwords sent over exposed networks, and for automatically launching a customer application.

Gateway 420 accesses configuration file 438 via change workstation gateway attributes (CHGWSGA) as represented by line 537, and with sockets block 448, as represented by lines 539, 541. In this embodiment, gateway 420 communicates with virtual terminal manager functional manager 436 via initiate (I) block 428 as represented by OPEN lines 521, 529; via read (R) block 430, as represented by READ lines 523, 525 and 531; via write (W) block 432 as represented by WRITE lines 527, 533; and via terminate (T) block 434 as represented by CLOSE lines 528 and 535. Blocks 428–434 represent the virtual terminal (VT) application program interfaces (API) used: open, read, write, and close, respectively. SIR/HTML translator block 422 calls SAC to build screen objects, translate them to HTML form and send them to client browser, as will described hereafter in connection with FIGS. 7, 8 A and 8B, VTAPI I/F block 426 performs method steps 226, 221, 225, 233, 227 and 236; all of the other steps shown are performed in VTAPI session manager 424.

Referring now to FIGS. 1–3, in operation, in accordance with this invention, a workstation gateway 110 is a TCP/IP application that services requests from HTTP clients using the HTTP request/response protocol. These requests arrive in a variety of ways, for example: directly from a client browser 124, as shown in FIG. 1, to the listening port (for example, on line 137, 557 ), or by redirection of any HTTP connect request that redirects the workstation gateway keyboard to a local or remote AS/400.

Figure 9A:
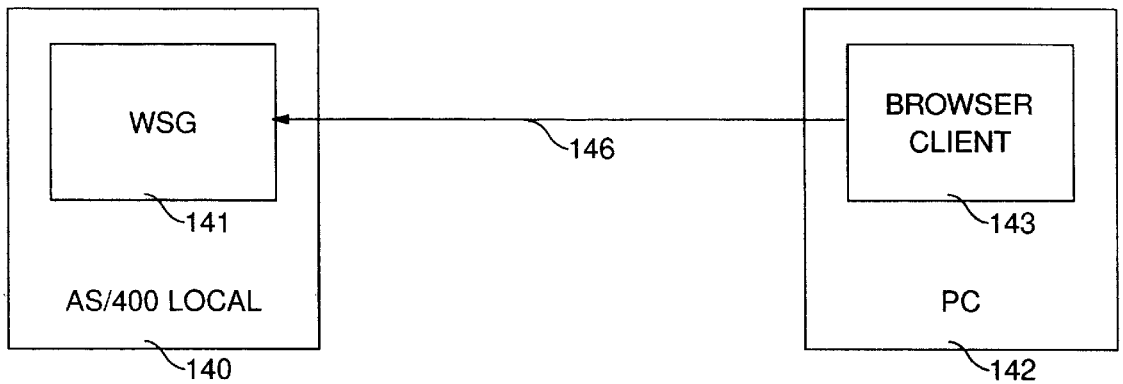
FIGS. 9A and 9B are diagrammatic representations of two configurations of gateway/browser client systems.
Figure 9B:
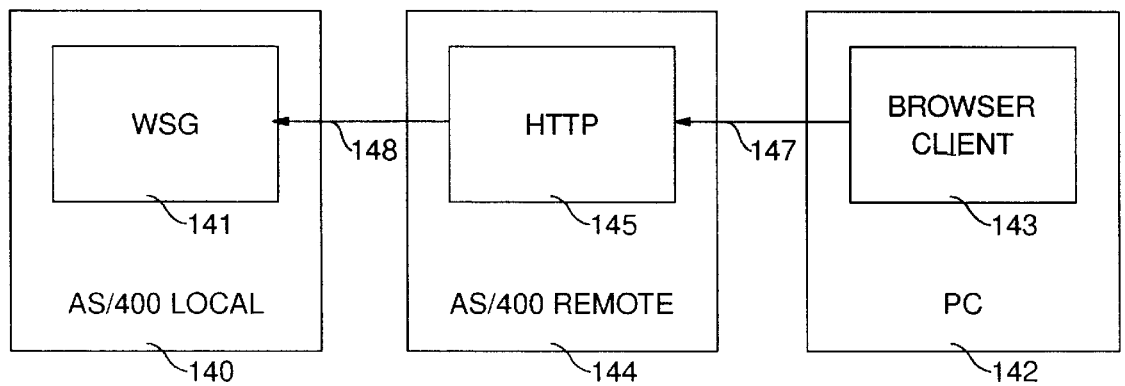

Referring to FIGS. 9A and 9B, this redirection is illustrated with respect to local AS/400 system 140 workstation gateway 141 and personal computer 142 browser client 143. In FIG. 9A, browser client 143 sends a direct request to gateway 141. In FIG. 9B, direct request 147 is sent to AS/400 system 144, which includes HTTP 145, which redirects the request as represented by line 148 to gateway 141 at local AS/400 system 140. Clients 143 may be redirected to the workstation gateway server 141 by an HTTP server 145, if that HTTP server 145 is configured to do so. Since an HTTP server is not required to be running on the same AS/400 system as the WSG server, the request may actually have been sent to a "remote" AS/400 system 144 before being redirected to the "local" AS/400 system 140. In this respect, the term "local" means the AS/400 system upon which the work station server is running. In this embodiment, the AS/400 system is represented by blocks 100–114 in FIG. 1, and by everything in FIG. 3 excepting block 450.

Once the initial connect request is received from a client 120, that client is considered "active", and all future connection requests for that client 124 occur over an arbitrary port number. This port number is embedded into all HTML links and forms sent to client 124 (line 137), starting with the initial panel.

Client 124 remains active until the session is signed off (step 227, 257) or the inactivity timeout limit is reached.

In accordance with this embodiment of the invention, workstation gateway 110 maintains the illusion that browser 124 is logically connected to AS/400 application 104 even though every transaction between the browser 124 and server 110 disconnects.

Server 110 maintains the virtual terminal connection indefinitely or until browser 124 logs off (step 257) or an inactivity timeout value is exceeded, as is represented by process steps 227 and 257 (FIG. 2), meaning session closed by browser client or timed out.

5250/HTML Workstation Gateway Connect Uniform Resource Indicator (URI) Interpretation A preferred embodiment of the workstation gateway server 110 of this invention is provided by the IBM 5250/HTML Workstation Gateway. In accordance with this embodiment, the following described connection URI parameters are provided.

Connection URI Parameters

Figure 4:
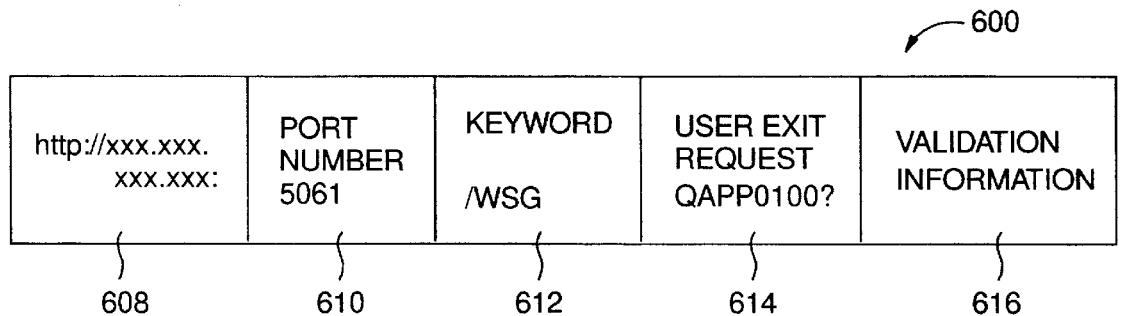
FIG. 4 is a diagram illustrating the format of a session connection HTML link.

Referring to FIG. 4, the session connection syntax to initiate a new 5250/HTML Workstation Gateway 110 session with a web browser client 124 has the form:

http://xxx.xxx.xxx.xxx:5061/WSG/ QAPP0100APP0100?any_oper_info

This connect identifier string 600 is broken down as set forth in Table 1.

TABLE 1

INITIATE CONNECTION URI IDENTIFIER STRING

| URI KEYWORD | DESCRIPTION |
|---|---|
| http://xxx.xxx.xxxxx.xx-x:5061 | The 5250/HTML Workstation Gateway HTTP hyperlink 608, 610. The port number 610 allocated for the 5250/HTML Workstation Gateway server 110 is defined in the TCP/IP Services Database 444, and is assumed to be 5061, for this example. |
| /WSG | The 5250/HTML Workstation Gateway program request keyword 612. This keyword indicates the request is for the 5250/HT-ML Workstation Gateway 420 and not HTTP Web Server 446. |
| /QAPP0100? | The 5250/HTML Workstation Gateway exit point QIBM_QTMT_WSG format |

TABLE 1-continued

INITIATE CONNECTION URI IDENTIFIER STRING

| URI KEYWORD | DESCRIPTION |
|---|---|
| | QAPP0100 user exit request 614 indicator (block 418). |
| any_oper_info | This is any validation information 616 that the client would like to send to the User Exit program 418 (if it is registered) for exit point QAPP0100. This portion is optional. |

Note: This URI 600 points to a session initiation request, and herein applies only to new sessions, and may be sent to either 5250/HTML Workstation Gateway 420 or HTTP servers 446 (FIG. 3). Sending this URI 600 to an established session (on a different port) results in an authentication error if the sender is not the session owner.

Figure 5:
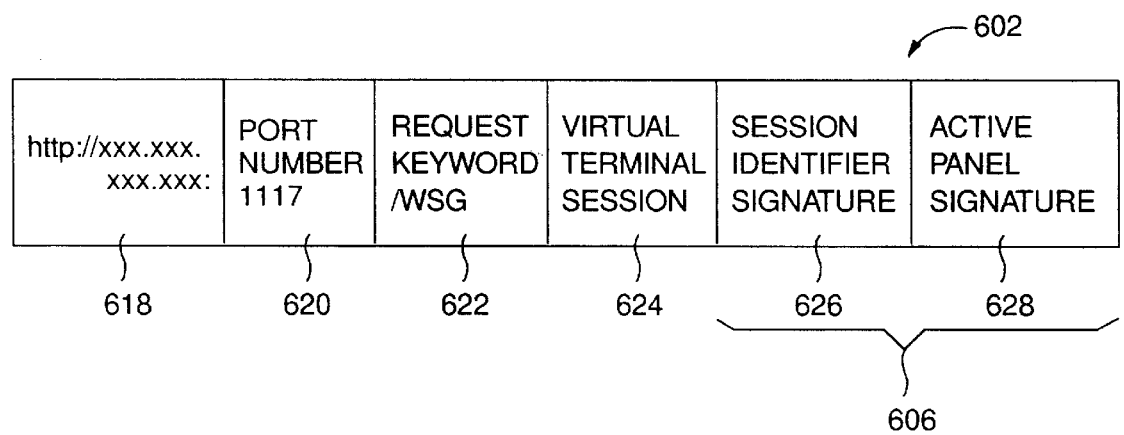
FIG. 5 is a diagram illustrating the format of an established session HTML link.
Figure 6:
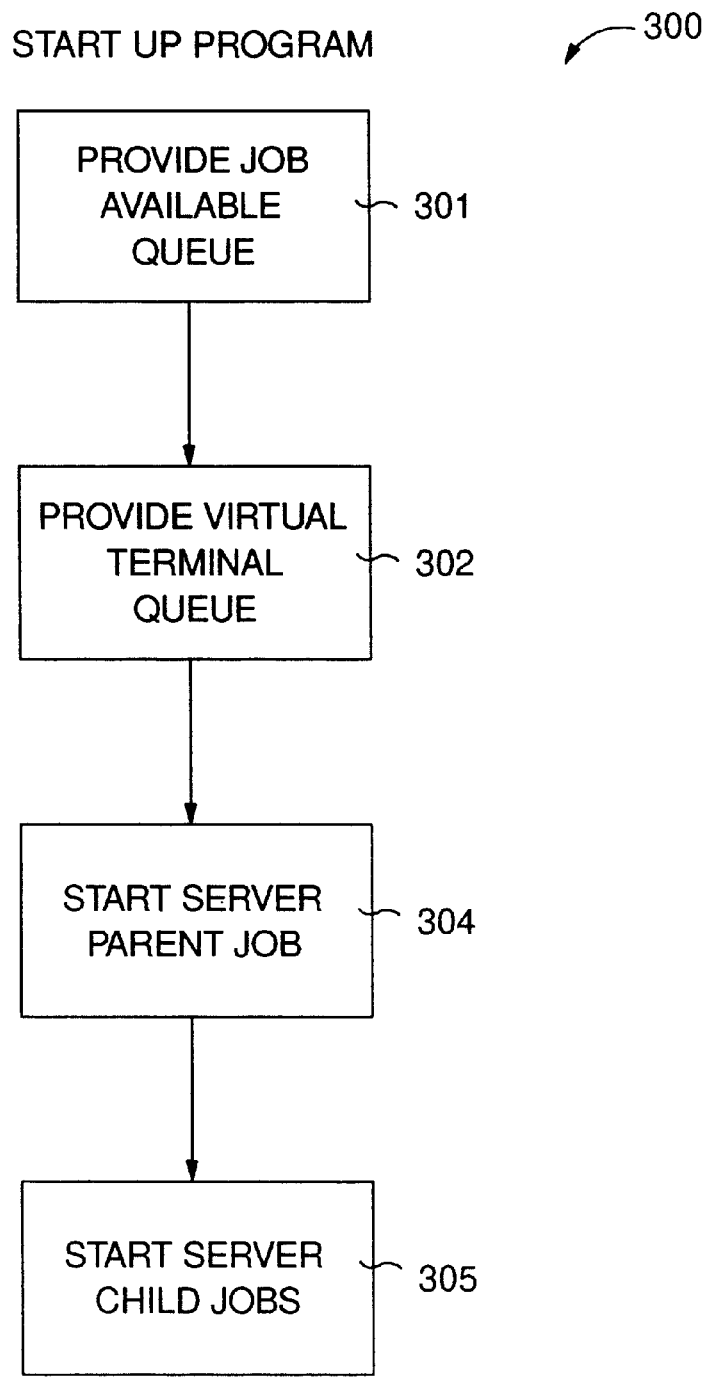
FIG. 6 is a flow diagram of the start up program.

5250/HTML Workstation Gateway Session URI Interpretation Established Session URI Parameters Referring to FIG. 5, the session identifier string 602 for an established 5250/HTML Workstation Gateway 110 session with a Web Browser client 124 has the sample form:

http://xxx.xxx.xxx.xxx:1117/WSG/067486/QTMTWSG/QTWSG00712/01C863B24F0CE391/1B145952

Session identifier string 602 is broken down as shown in Table 2:

TABLE 2

ESTABLISHED CONNECTION URI IDENTIFIER STRING

| URI Keyword | Description |
|---|---|
| http://xxx.xxx.xxx.xxx:1117 | The 5250/HTML Workstation Gateway HTTP hyperlink 618, 620. The port number 620 allocated for this client is 1117. |
| /WSG | The 5250/HTML Workstation Gateway request keyword 622. This keyword indicates the request is for the 5250/HTML Workstation Gateway 420 and not HTTP Web Server 446. |
| /067486/QTMTWSG/QTWSG00712 | The 5250/HTML Workstation Gateway virtual terminal session 624 that was allocated for this client 124. |
| /01C863B24F0CE391 | The 5250/HTML Workstation Gateway session identifier signature 626. |
| /1B145952 | The 5250/HTML Workstation Gateway active panel signature 628. |

Note: This URI 602 applies only to established (already signed on) sessions.

Spoofing of Session Panels:

Once an application 104 is started with a given web browser 124, another browser 120, 122 cannot come along and connect or spoof (that is, steal, or take over) that browsers connection 133, 137 and application 104.

Workstation gateway server 110 acts on browser 124 requests in accordance with the content of the request-URI 600, 602 from the request line 557. However, aside from the initial session request 600, it will only act on those requests 602 that submit the proper authentication string 606 via the HTML "hidden" forms input field, to identify the user as the session initiator. Authentication string 606 identifies both the session initiator 626 and the currently active panel 628.

The session 626 and panel 628 signatures for a browser client 124 has the form described previously. Signatures are part of the entire session identifier string 602 (also called the connect identifier string). String 600 is a request for a new WSG session to be assigned to a browser client, and has no signatures in it. Session identifier 626 is generated by a 32-bit CRC hashing algorithm of the session string 624 and initiation time stamp 630. These strings are combined at session initiation time to create a session identifier string 626, in response to a browser client requesting a gateway session. This is generated only once—at session initiation time.

For example, the string "Wed Jul 5 09 :58:23 1995" and string 624 "067486/QTMTWSG/QTWSG00712" both get hashed together into a session identifier signature 626 (2 different keys concatenated together) as demonstrated in the prototype code debug messages of Table 3:

TABLE 3 vt_open: Hash pszTime for 1st half key value
vt_open: pszTime: >Wed Jul 5 09:58:23 1995<
CalcCRC32: CRC Seed: >00000000<
CalcCRC32: CRC Value: >8D3FAFE6<
vt_open: Hash VT_Job for 2nd half key value
vt_open: VT_Job: >067486/QTMTWSG/QTWSG00712<
CalcCRC32: CRC Seed: >00000000<
CalcCRC32: CRC Value: >81CD39DF<
vt_open: Using VT_Key >8D3FAFE681CD39DF<

Likewise, panel identifier signature 628 (1 key) for browser client 124 is generated by a 32-bit CRC hashing algorithm of the screen panel buffer (not shown). This is done for EVERY panel that goes out, so every panel has a different panel key 628. Thus, a panel key is a portion (sub-string) of the session identifier string, generated from hashing the panel into a key. (The terms "key" and "signature" are used interchangeably.)

Cyclic redundancy checking (CRC) hashing technology is well known to those skilled in the art. See, for example, Terry Ritter, "The Great CRC Mystery", in Dr. Dobb's Journal, February 1986, pages 26–34.

In accordance with the invention, dynamic session authentication checking is done by the server 110–114 to insure screen spoofing does not occur. Since authentication keys are unique to each session and each panel, spoofing can only occur via real-time interception of the keys. This provides "pretty good" security, because keys are hashed using time stamps, meaning keys cannot be re-used. The hashing algorithm has odds of getting duplicate keys of "1 in 4 billion". As the server uses 3 keys, the odds against spoofing are fairly high. As is illustrated in FIG. 5, field 626 is two keys concatenated together: the first key is from hashing the time stamp, and the second key is from hashing string 624. The third key is string 628. Thus, field 606 represents the three keys all concatenated together. This time stamp is created and used only once, for each web browser client that requests a session. This means each session has a single time stamp associated with it, intended to defeat attempts to spoof a session because the time stamp changes each time a new session is requested. This time stamp does not change with each panel; rather, the panel key tracks panel changes as there may be a series of panels within a session. The real keys exist in the session identifier signature 626, as the panel signature 628 is mainly to keep the client Web Browser 124 "tree" in sync with the active panel.

In accordance with this preferred embodiment based on the IBM 5250/HTML workstation gateway, server 110 is started via the AS/400 STRTCPSVR command or it is started via AUTOSTART option of the STRTCP command. These and other AS/400 control language (CL) commands herein referenced are described in IBM publications SC21-9775-02, SC21-9776-02, SC21-9777-02, SC21-9778-02, SC21-9779-02, AS/400 Prog: CL Ref, volumes 1–5, respectively.

Figure 7:
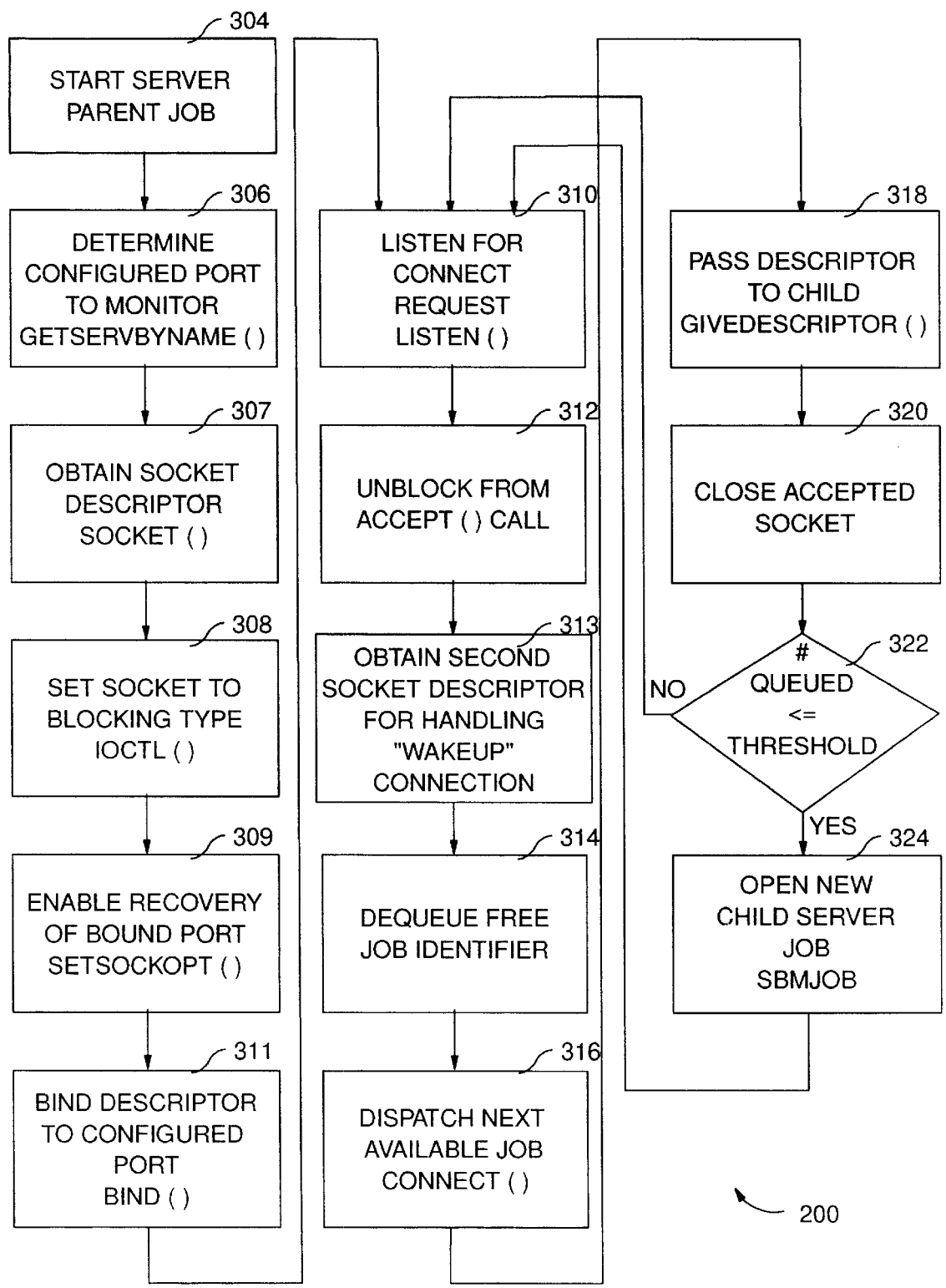
FIG. 7 is a flow diagram illustrating the method steps of the server parent job of FIG. 2.

Referring to FIGS. 2 and 3, the workstation gateway server is organized into:

1) A single parent (or master) job 200 that listens for and accepts connection requests, as may be received on line 557, from HTTP browser clients 124 on network 450. The port (Table 1, port 5061) used by 5250/HTML Workstation Gateway 420 is different from the HTTP server 446, because the 5250/HTML Workstation Gateway is a new type of server for which there is no "well-known" port. Parent job 200 has only one function—to hand off connection requests to child jobs 202, 204. Parent job 200 is the first job that can successfully do a bind( ) socket call to the configured port. Socket calls are done by blocks 424 and 420. Sockets programming requires that only one job can bind successfully to the configured port. A configured port is the port on which requests are detected, which port can be changed from a default value through the use of the WRKSRVTBLE, ADDSRVTBLE, and RMVSRVTBLE CL commands. This allows customers to change the socket port value listened to, and is determined in step 306 (FIG. 7.)

2) One or more child (or slave) jobs 202, 204, each of which has enqueued its identifier on the job available queue 206. A child job 202 performs the actual work to satisfy the client 124 connect request. This is represented by blocks 428–434 and lines 521–528 in FIG. 3. Child jobs 202, 204 are those jobs that receive an address-already-in-use (EADDINUSE) socket error when attempting to bind( ) to the configured port. In this manner it is determined that a parent is already running, and that this particular batch job should be run as a child job. There are two types of child jobs:

a) A free child job 330–340 is a job that is not currently processing a client session. Free child jobs DO have their identifier on the job available queue 206.

b) An active child job (not 330–340) is a job that is currently processing (steps 226, 256) a client session that has not yet signed off or timed out (steps 227, 257). Active child jobs do NOT have their identifier on the job available queue 206.

3) A job available queue 206 which provides the parent job 200 a means to identify free child 202, 204 jobs 330–340 to handle new connect requests, via a "wakeup" socket connect( ) request 316, 214, 244. Since a child job 202, 204 may be busy processing other sessions, the "wakeup" scheme allows each child job to know the parent 200 is attempting to dispatch a new session to the child, and therefore the child job should block, step 252, 222, on the takedescriptor( ) socket call. This insures a child job will not block unless the parent job has already performed a givedescriptor( ) call 218 to it. (Some socket calls block further server activity until interrupted. This invention avoids such indeterminate blocking.)

Since only one WSG server 110–114 can own the "well-known" port, WSG servers 200, 202, 204, 110–114 essentially function in either one of two modes: they are either the master server, aka server parent, 200 (of which there can only be one), or they are slave servers, aka server children, 202, 204. (This reference to a "well-known" port is in anticipation that it will become such as the product embodiment of this invention gains wide-spread usage. It is not yet truly well-known as that term is generally understood.)

Master server 200 owns the "well-known" port, all other servers 202, 204 are slave servers and perform the actual work supporting established browser-to-application, 124 to 104, or 450 to 410, state sessions. Master server 200 assigns new sessions amongst the slave servers 202, 204 and does no other work. (Thus, block 500, FIG. 3, does not exist in an instantiation of master server 200.)

Each slave server 112 (202, 204) must notify (step 210, 240) master server 110 (200) how many new sessions it can support, before all of its slots are used up with established browser (120, 122) to application (100, 102) sessions. Whenever an established browser-to-application session is ended, slave 202, 204 must notify (step 231, 261) the master 200 it has an additional slot 330–340 available.

Slave and master servers communicate through a common queue object 206, where each slave job 202, 204 enqueues (step 210, 240) one or more entries 330–340 at startup time that indicates "this slot is available for a new session". A job is an AS/400 batch job, in this embodiment, and a slot is the same thing as a session, in that each batch job manages several sessions (or slots.)

As session requests arrive (step 310, line 557) at master server 200, the master dequeues (step 314) an entry (say, 330), and gives (steps 316, 318, 244, 246) the request to the slave server 204 whose entry 330 was dequeued. This assignment continues, each slave server 202, 204 managing one or more established sessions until all of its sessions (that is, slots) are full (active=n) or one of the sessions ends (step 227, 257). If a session ends, slave 202, 204 enqueues a single entry (step 231, 261) to indicate a slot has been made available. In this sense, an entry is a slot and is also known as a session.

In accordance with this specific embodiment, the number of slots (n) each slave server supports is called its multiplexing value, and this value can be configured (in configuration file 438) by the customer to achieve the best performance on his AS/400 system. Since each WSG server 110–114, 200–204, 420 running on an AS/400 runs as a batch job in a sub-system, management of the number of jobs running is critical to performance. Because there is significant overhead associated with each batch job 330–340, using a single batch job to support one browser 124 to application 104 session wastes system resources and degrades performance.

To support even better performance, both master server 200 and slave servers 202, 204 are aware of a "floor" or "backlog" of available slots/sessions 330–340 that must be maintained. If the total number of available slots 330–340 from all the slave servers drops below this value (steps 228, 250, 322), then another slave server 112–114 is started (steps 230, 260, 324). This "pre-starting" of slave servers 112–114 helps to boost performance at times of peak demand, which otherwise would introduce a latency delay while a server initializes. Since each slave server 202, 204 is aware of a "floor" or "backlog", they can compare the total number of available slots 330–340 from all the slave jobs against this floor value, and make intelligent decisions on whether the available number of slots is too high, and terminate slave servers, or jobs, to reduce this number back down to the floor level.

A Cyclic Redundancy Check (CRC) hashing mechanism is used to maintain both a client 120–124, 450 identifier 626 and a data identifier 628, which is exchanged on each data transaction (steps 226, 256, block 500). This provides authentication and synchronization information from the client 120–124 to the server application 110–114, 200–204. Server application 112 can then allow controlled data exchange among multiple clients 120–122 that is transparent to and independent of other clients and their respective applications 100–102.

The CRC hashing results in a string of invariant EBCDIC hexadecimal characters (0–9, A–F) as output, which is then converted to ASCII and sent to the client 124, etc. Using invariant characters allows this solution to be leveraged across most national languages.

Referring to FIG. 7, the 5250/HTML Workstation Gateway Startup Job, or program, 300 of this specific preferred embodiment is executed by block 420.

Start-up Responsibilities:

Startup program 300 has the following responsibilities:
1. In step 301, providing a job available queue (*USRQ) 206.
2. In step 302, providing a virtual terminal queue (*DTAQ).
3. In steps 304 and 305, respectively, starting the parent 200 and first child 202 jobs via SBMJOB.

Step 301, providing a job available queue 206: start-up program 300 creates the "job available queue" 206, on which free child jobs 202, 204 will register themselves. HTML Workstation Gateway parent job 200 uses this queue 206 to find a child job 202, 204 that is available to handle a connection from a new browser client 120–124, 450. The name of this queue 206 is QWSG/QTMTJOBQ, and it is a FIFO queue. Queue 206 is FIFO type in order to allow child jobs 202, 204 to "drain" their entries 330–340 off the queue when the child job ends.

Step 302, providing a virtual terminal queue: parent job 200 requires a "virtual terminal queue" 417, which is how the virtual terminal notifies child jobs 202, 204 that the AS/400 has 5250 datastreams pending. The name of this queue is QWSG/QTMTVTQ, and it is a keyed queue. The key is the job identifier.

Steps 304 and 305, starting the parent and child jobs: once the queues are created and initialized, startup program (QTMTJOBS *PGM) 300 starts a parent 200 and an appropriate number of child jobs 202, 204 based on the selected multiplexing value. Parent job 200 binds to the configured port and listens for connect requests (step 310). Child job 202 reads configuration file 438 to determine the level of multiplexing sessions of connect requests that is to be done.

Startup program 300 starts both parent 200 and child jobs 202, 204 using the SBMJOB CL command.

Parent 200 Responsibilities:

Referring to FIG. 7, 5250/HTML Workstation Gateway parent job 200 has the following responsibilities:
1. In step 310, listening on the configured port (port extracted from services database 438).
2. In step 314, identifying the next available child 202, 204.
3. In steps 316 and 318, dispatching the next available child.
4. In step 324, starting additional child jobs 202, 204 to handle high levels of connect requests or to replace jobs that may have terminated unexpectedly.

(The socket programming calls and instructions referred to in the following description are further described in IBM AS/400 System API Reference, Vol. 3, Version 3, September 1994, IBM Publication SC41-3801-00, pages 65-1 through 65-74. The server parent job instantiation is similar to that for the server child job set forth in FIG. 3, except that the parent job instantiation does not require the structure of block 500. Consequently, where appropriate in the following description, reference may be made to the structural elements of FIG. 3 as though they formed a server parent 200.)

Step 310, listening on the configured port. Parent job 200 monitors the configured port for connect requests from "browser" clients (such as browsers 120–124 on TCP/IP network 450) via the accepto socket call (on line 539). In steps 307 through 311 and 310, server 200 sets up (that is, binds) the configured port socket 448, as is described hereafter.

In step 306, parent job 200 determines the configured port to monitor by using the getservbyname( ) socket call. The getservbyname( ) call retrieves information about services listed in the service database file 444, which represents the WRKSRVTBLE repository.

In step 307, server 200 obtains a socket descriptor using the socket( ) API for the AF_INET address family, the SOCK_STREAM type, and the IPPROTO_TCP protocol.

In step 308, server 200 sets the socket to blocking type using the FIONBIO option of the ioctl( ) socket call.

In step 309, server 200 enables recovery (in case of errors or problems) of the bound port from ½ closed state by setting the socket descriptor option SO_REUSEADDR using the setsockopt( ) socket call.

In step 311, server 200 binds the descriptor to the configured port using the bind( ) socket call.

In step 310, server 200 states the willingness to accept connections using the listen( ) socket call.

The service name for 5250/HTML Workstation Gateway is 'wsg' and the protocol is TCP. Browser clients 120–124 are connectionless oriented, stateless communications.

Identifying the next available child: Referring further to FIG. 7, identifying the next available child proceeds as follows. As connection requests arrive (step 310, lines 557, 539) on the configured port, in step 312, parent 200 unblocks from the accept( ) call and in step 313 obtains a second socket descriptor for handling the "wakeup" connection. Once the accept( ) completes (step 312), in step 314 parent job 200 attempts to dequeue a free child job identifier 340. The dequeued element 330 is the job identifier of the free child job, say 202, and the allocated port number for that child job 202. There is one port for each session/slot as represented by blocks 336–340 of queue object 206. The allocated port number is the port on which that child job 202 is blocked on select( ) waiting (step 214) to accept connect requests.

Dispatching the next available child: Once parent 200 has identified a free child job 340, in step 316 parent 200 dispatches that job 340 by sending (step 316) a "wakeup" signal by performing a socket connect( ) request to a free child job 202. Parent job 200 reads the dequeued element off queue 206. If an entry from 330–334 was dequeued, then parent dispatches child job 204. If an entry from 336–340 was dequeued, parent 200 dispatches child job 202. Parent job 200 READS the entry information, so it knows which child job 202, 204 to dispatch.

Any child job 202 that is free will still be listening (step 214) on all the ports allocated to it, and the connect( ) request from parent job 200 in step 316 makes the child unblock in step 222 from the selects socket call and block on a takedescriptor( ) call. Once the child job gets the "wakeup" signal in step 214, in step 318 parent job 200 performs a givedescriptor( ) socket call. The sockets givedescriptor( ) passes a descriptor, that is, socket, for the connection to the targeted child job 202. A queue entry 330–340 on queue 206 identifies a socket in a particular child job; that is, a child job and a socket within that child job—and this is obtained in step 307. Since givedescriptor( ) is a non-blocking socket call, parent 200 need not wait for the corresponding takedescriptor( ) call to complete before being allowed to continue. Consequently, in step 320, server parent job 200 executes close( ) to close the accepted socket.

In steps 316, 318, after passing the connection to child job 202, in step 310 parent 200 resumes monitoring its listening socket 448 for incoming connect requests from browser clients 120–124 on, in this embodiment, TCP/IP network 450. This completes the parent 200 side of the "handoff".

Starting additional server child jobs: Referring further to FIG. 7, parent server job 200 starts additional 5250 server child jobs 204, etc., as follows. Preliminary to step 322, parent job 200 monitors the job available queue 206 and extracts the number of entries 330–340 stacked on the queue (#QUEUED). When queue 206 is close to empty (step 322 evaluates true), in step 324, parent 200 attempts to "prestart" another child job 204 to handle additional connect requests, in order to reduce any latency time associated with SBM-JOB startup.

Figure 8A:
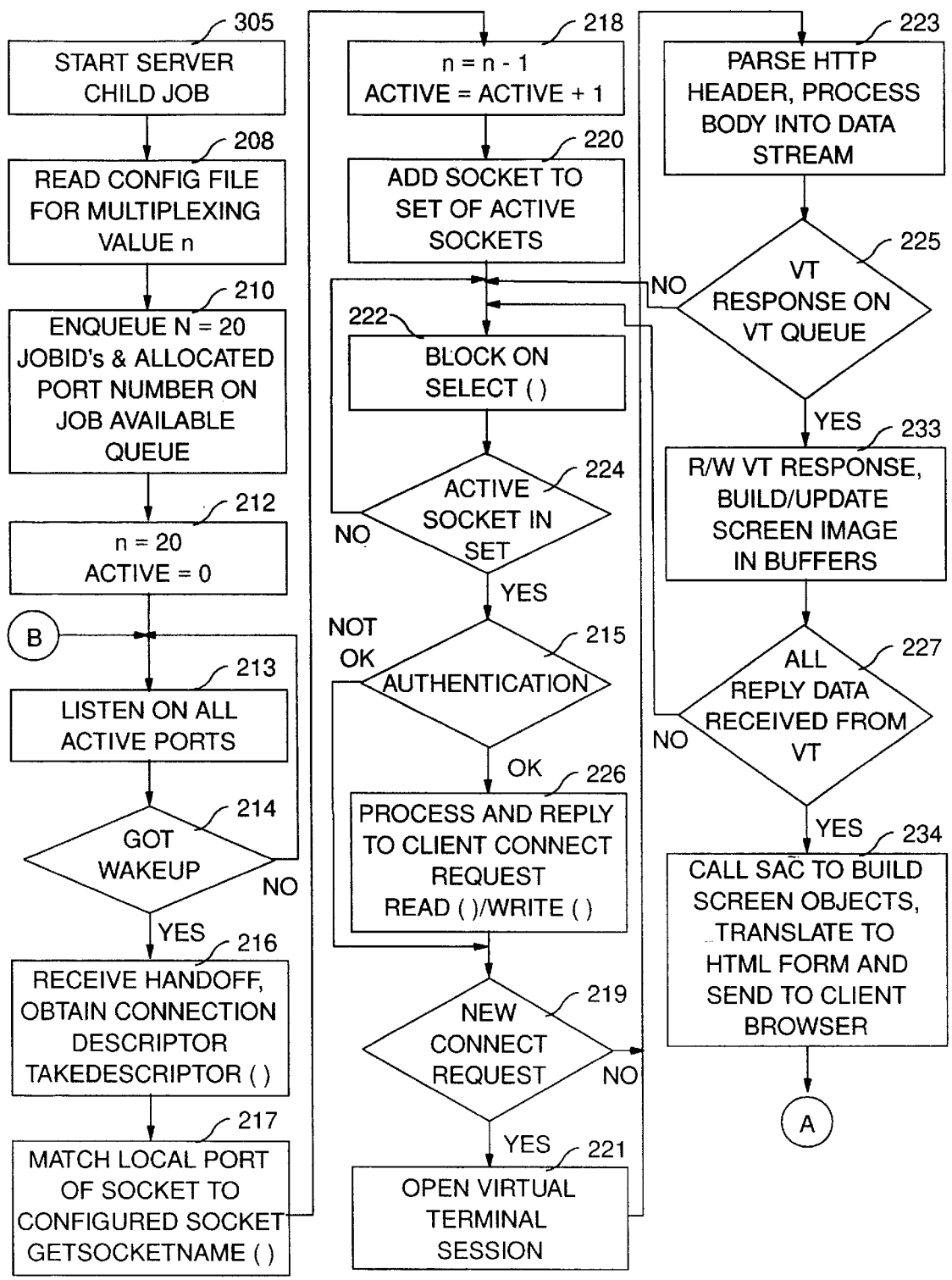
FIGS. 8A and 8B are a flow diagram illustrating the method steps of the server child job 1 of FIG. 2.
Figure 8B:
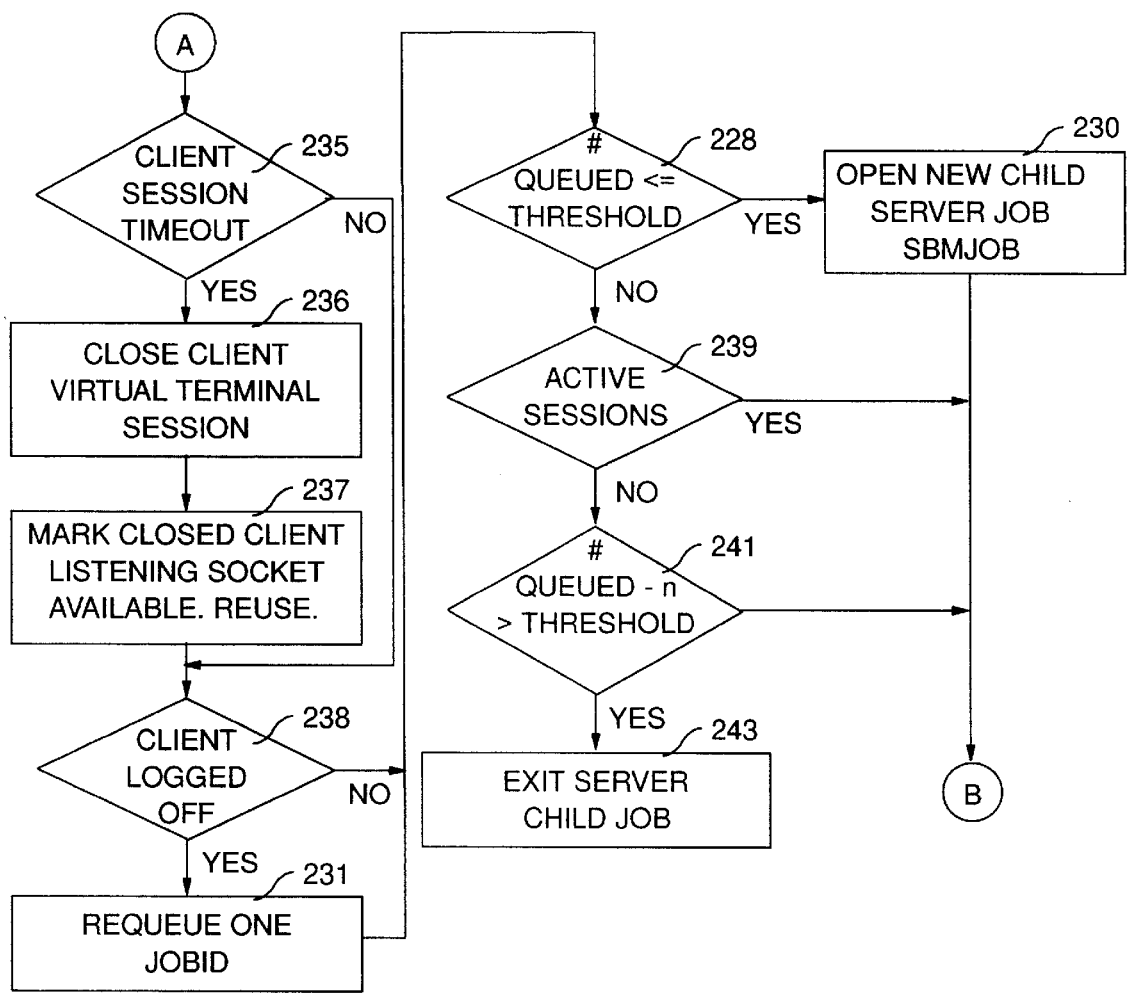

Child Job 202 Responsibilities:

Referring now to FIGS. 8A and 8B, 5250/HTML Workstation Gateway Child Job 202 (as also the other server child jobs 204, etc.) has the following responsibilities:

1. Register for new work on the job available queue 206 (step 210).
2. Listen on all active ports (step 213).
3. Open/Write (step 226) to the AS/400 virtual terminal session 500.
4. Read (also step 226) from the AS/400 virtual terminal session 500.
5. Write (step 234) to the client session 120–124, 450.
6. Log the request/response (step 226).
7. Monitor and close (steps 235–238) inactive clients 120–124, 450.
8. Re-register (step 231) on queue 206 for new work.

Step 210, register for new work on the job available queue 206. In step 210, child job 202 registers itself as ready for work by enqueueing its job identifier and allocated port number on the job available queue 206. In steps 210, 212, child job 202 stacks n copies 336–340 of its job identifier on the queue—where n is the configured level (from configuration file 438, step 208) of multiplexing to be performed.

Step 231, re-register available sessions. As sessions timeout (step 235) or log off (step 238), in step 231 child job 202 re-registers its available sessions by restacking the job identifier to available queue 206.

Step 213, listen on all active ports (a collection of specific sockets within a child job). Up to n connections can be active in child job 202, meaning the child can be listening (as is also represented by line 557, FIG. 3), in step 213 on up to n different ports for connect requests.

Steps 216, 226 accept and reply. If any port shows a connect request is pending (step 214 evaluates true), in step 216 child 202 accepts, and in step 226 processes and replies to the client connect request.

Step 215, authenticate session. Between steps 224 and 226 (and, similarly, between steps 254 and 256, FIG. 2), session authentication checking occurs. If the authentication check was good (OK), step 226 occurs; if not (NOT OK), step 226 is skipped. All active ports are checked on every pass in loop 229 through steps 213, 214.

Once registered on the job available queue 206, in steps 218, 220, 222, and 224, child job 202 waits for work by looping using a select( ) socket call for a timer, and in step 226 socket macros monitor and process data from active descriptors (clients) 120–124. With this scheme, blocking is avoided on either an accept( ) or a takedescriptor( ) call until the parent job 200 performs a "wakeup" via a connect( ) request to one of the active descriptors. (While "descriptor" is "socket", which is also "port" plus "address", here port is used loosely, to mean socket.) As part of the "wakeup", in step 318 parent job 200 sends its job identifier to the child, which the child uses in step 216 for the call to takedescriptor( ) that receives the "handoff" from parent job 200. Session ID strings 600, 602 are transmitted on lines 555 and 557. A job identifier is used as a parameter to a givedescriptor( ) call 246 or 216, and as a value stacked onto queue object 206. The value stacked on queue 206 is obtained by parent job 200 for use in step 318.

In step 216, the takedescriptor( ) provides child 202 with its own descriptor for the connection, separate from the descriptor used in parent 200.

To further insure that parent WSG server job was the 5250/HTML workstation gateway server 420 from which the socket is received, in step 217 the getsockname( ) socket call is used to match the local port of the socket with that configured in the TCP/IP services database 444 (FIG. 3.) This is done to assure that "our own" server did the givedescriptor( ) socket call, because takedescriptor( ) works with any kind of server, such as FTP, Telnet, and so forth, and that is NOT wanted. Givedescriptor( ) uses job identifiers as a parameter. Job identifiers uniquely identify an AS/400 batch job, such that WSG servers can be distinguished from one another. A descriptor is synonymous with socket; thus, the handoff previously described refers to sockets, and works by the parent doing a givedescriptor( ) call to give the socket to the child job. The child job does a takedescriptor( ) to get the socket from the parent. As part of the takedescriptor( ), the child job uses the parent's job identifier to insure it only takes sockets from the WSG parent job, and only that parent job. The parents job is is passed as part of the "wakeup".

Open/Write to the AS/400 virtual terminal session: Referring further to FIG. 8A, if this is a new connect request (step 219 evaluates true), in step 221, child job 202 will open a virtual terminal session 500. Then, for either new or active connections, in step 223 child 200 reads the request (on line 539, 557) from the browser 120–124, parses the HTTP headers, and the body of the request is processed into a 5250 data stream and sent inbound into the operating system, loosely represented by blocks 500 and 502 (a clear demarcation of the operating system is not presented in the figures.)

Read from the AS/400 virtual terminal session: The child job waits in step 225 for a queue notification from the virtual terminal session 500, indicating reply data is pending. Branch 225 is called if branch 224 is true. An active socket can be either a new connection or an old connection that has not yet finished and done the yes branch on block 225. When a virtual terminal session has a response, virtual terminal manager 416 stacks a notification on the virtual terminal queue 417 provided by start up program 300 in step 302. This queue 417 is checked in step 225 by gateway 420. In step 233, child job 200 both reads and writes to the virtual terminal: it reads (line 531, step 226, 256) in the response and builds/updates an AS/400 screen image in buffers using the response data. Several buffers are maintained, including:

1) EBCDIC screen image buffer
2) Embedded HTML buffer
3) Field Format Table (input fields buffer)
4) Attributes buffer Write to the client session: If all the reply data (via block 430) from the virtual terminal 500 has been received (step 227 evaluates true), in step 234 child 202 calls the Screen Analysis and Construction (SAC) functions to build/update the SAC screen objects. The output of the SAC functions are called Static Intermediate Representation (SIR) objects. These objects are not yet in HTML format—they are translated in step 234 into HTML markup tags along with any embedded HTML buffer entries into the final HTML form that is sent to browser 120–124.

Child 202, 420, 422 formats the AS/400 panel image as an HTML form. This form is returned (line 541, 557) to the client, such as a client 120–124 machine on TCP/IP network 450, along with the appropriate HTTP header lines:

status-line CRLF header-line(s) CRLF

CRLF entity-body (HTML form)

Log request/response: The AS/400 410–414 indicates (step 227 evaluates true) when all reply data has been sent through the 5250 data stream (the 5250 data stream does not necessarily arrive all in one piece). Therefore, no HTML form is sent back (line 541, 555, step 234) to the client 120–124, 450 until the AS/400 indicates all data has been received.

Monitor and close inactive clients: If a client session is inactive for a period of time longer than the configured timeout value (step 235), then in step 236 that child job 202 closes the clients virtual terminal session. However, the listening socket associated with that client is not closed, but in step 237 is marked as available and re-used.

Re-register for new work: If a client session has been inactive too long (step 235 evaluates true) or the client logs off (step 238 evaluates true), in step 231 child job 202 makes the session available again for new clients. This is done be re-queuing a job identifier 336–340 for the child 202 back onto job available queue 206. A session timer (step 235) is maintained to track inactivity for each client 120–124. In step 228, child job 202 will also check that a sufficient number of available sessions exist, and in step 230 will prestart another child job if the number available is below threshold (threshold algorithm TBD). Furthermore, if the number of available sessions is greater than the threshold value, in step 239 child job 202 checks to see if it can safely exit and still leave sufficient available jobs to stay above the threshold value. As long as no established or active sessions (each session possibly containing several sockets) still belong in the job (each job possibly containing several sessions) and the threshold limit is maintained even with the loss of the child jobs (step 241 evaluates true), in step 243 child 202 can exit.

ALTERNATIVE EMBODIMENTS

It will be appreciated that, although specific embodiments of the invention have been described herein for purposes of illustration, various modifications may be made without departing from the spirit and scope of the Invention. In particular, it is within the scope of the invention to provide a memory device, such as a transmission medium, magnetic or optical tape or disc, or the like, for storing signals for controlling the operation of a computer according to the method of the invention and/or to structure its components in accordance with the system of the invention.

We claim:

1. A workstation gateway server system supporting connection oriented applications over a connectionless protocol, comprising:

a server parent job;

at least one child job;

said server parent job detecting connection requests from network browsers and handing said connection requests to said child job;

said child job satisfying said connection requests over said connectionless protocol while maintaining the illusion that the connection requester is logically connected to said application across a plurality of disconnected transactions.

2. The system of claim 1 wherein said server parent job owns a well-known port.

3. The system of claim 2 wherein said child job supports at least one established browser-to-application state session.

4. The system of claim 2 wherein said child job determines that a server parent job is already running upon receiving a socket error when attempting to bind to said port.

5. The system of claim 3 further comprising a common queue object for communications between said parent job and said child job.

6. The system of claim 3 wherein said child job blocks only when said server parent job is attempting to dispatch a new session to it.

7. The system of claim 5 wherein each said child job is operable to enqueue on said common queue object one or more slot available entries, and said parent job is operable to dequeue from said common queue object a slot available entry for each session it dispatches to said child job.

8. The system of claim 7 wherein said child job is operable upon completion of a session to enqueue in said common queue object a slot available entry.

9. The system of claim 7 wherein said server parent job is operable responsive to the number of slot available entries in said common queue object to start another child job.

10. The system of claim 7 wherein said child job is operable responsive to the number of slot available entries in said common queue object to start another child job.

11. The system of claim 8 wherein said server parent job is operable responsive to the number of slot available entries in said common queue object to terminate a child job.

12. The system of claim 8 wherein said child job is operable responsive to the number of slot available entries in said common queue object to terminate a child job.

13. A method for operating a computing system for connecting a plurality of applications and clients through a single server, the server maintaining the illusion of a connectionless-oriented environment to the client and a connection-oriented environment to the application, comprising the steps of:

executing a startup program according to the steps of:

providing a job available queue;

providing a virtual terminal queue;

starting a parent job; and starting a first child job;

executing said parent job according to the steps of:

monitoring a configured port for a client connect request;

responsive to receiving a request from a client to connect to an application, dequeueing a free child job identifier from said job available queue and dispatching to said free child job a client connect request;

responsive to said job available queue approaching empty, starting a new child job; and executing said child job according to the steps of:

registering for new work by enqueuing one or more of its job identifiers on said job available queue;

listening on active ports;

opening and selectively writing an application session;

selectively reading from said application session;

writing to a client session;

monitoring and closing inactive clients; and reregistering for new work on said job available queue.

14. The method of connecting a client to an application, comprising the steps of maintaining in a job available queue a plurality of identifiers of available child jobs;

responsive to a request from a client to connect to an application, operating a server parent job to dequeue from said job available queue the identifier of a next available child job and dispatch said request to said available child job; and operating said available child job to establish a connectionless-oriented communications environment for said client and a virtual connection-oriented communications environment for said application.

15. A workstation gateway server system supporting connection oriented applications over a connectionless protocol, comprising:

a server parent job owning a well-known port;

at least one child job supporting at least one established browser-to-application state session;

a common queue object for communications between said parent job and said child job;

said server parent job detecting connection requests from network browsers and handing said connection requests to said child job;

said child job satisfying said connection requests while maintaining the illusion that the connection requestor is logically connected to said application across a plurality of disconnected transactions;

each said child job being operable to enqueue on said common queue object one or more slot available entries, and said parent job being operable to dequeue from said common queue object a slot available entry for each session it dispatches to said child job.

16. The system of claim 15 wherein said child job is operable upon completion of a session to enqueue in said common queue object a slot available entry.

17. The system of claim 16 wherein said server parent job is operable responsive to the number of slot available entries in said common queue object to terminate a child job.

18. The system of claim 16 wherein said child job is operable responsive to the number of slot available entries in said common queue object to terminate a child job.

19. The system of claim 15 wherein said server parent job is operable responsive to the number of slot available entries in said common queue object to start another child job.

20. The system of claim 15 wherein said child job is operable responsive to the number of slot available entries in said common queue object to start another child job.

* * * * *